L. JANSE.
SIDE BEARING FOR RAILWAY VEHICLES AND THE LIKE.
APPLICATION FILED MAY 1, 1917.
1,257,358. Patented Feb. 26, 1918.
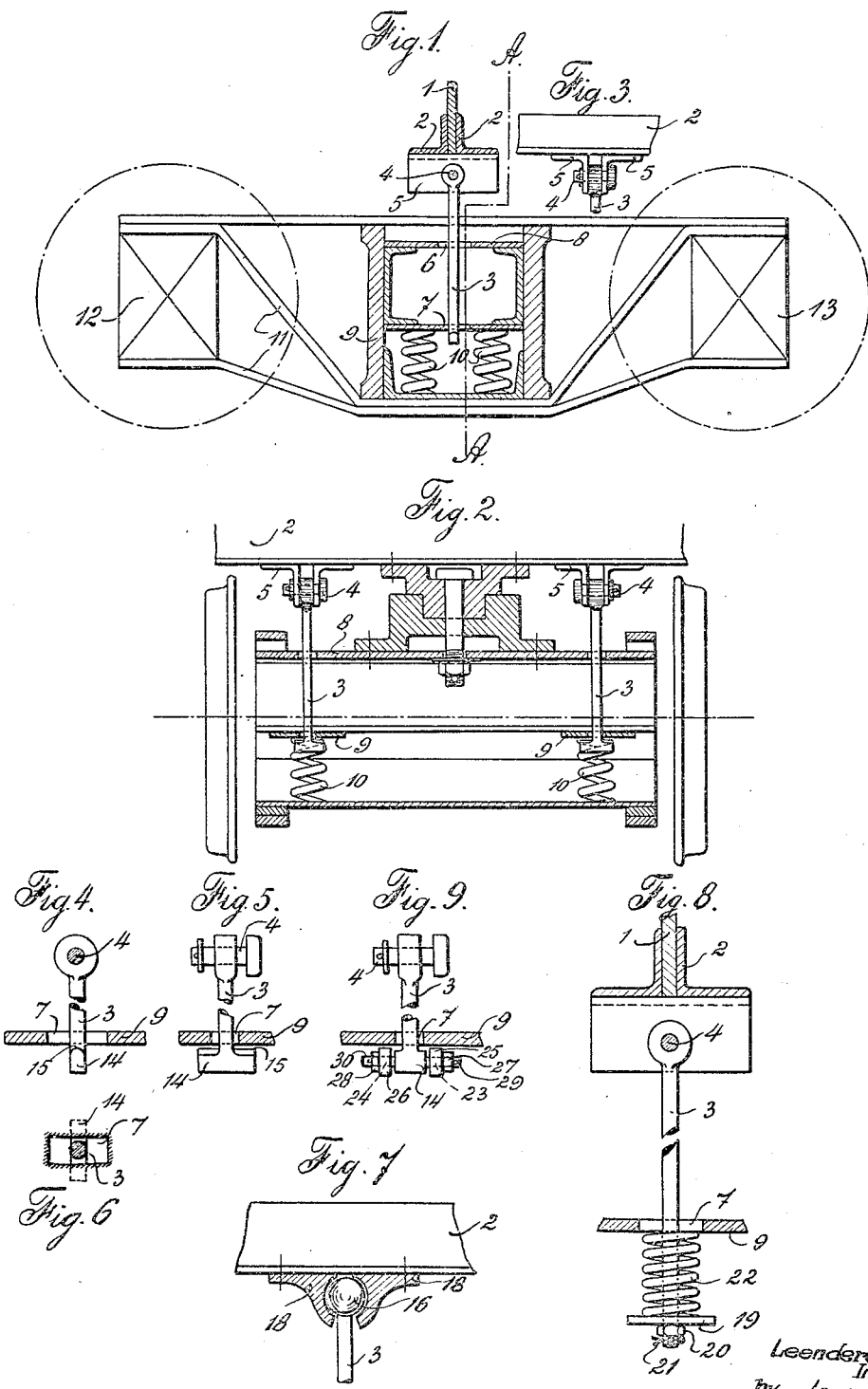

UNITED STATES PATENT OFFICE.

LEENDERT JANSE, OF APELDOORN, NETHERLANDS.

SIDE BEARING FOR RAILWAY-VEHICLES AND THE LIKE.

1,257,358.  Specification of Letters Patent.  Patented Feb. 26, 1918.

Application filed May 1, 1917. Serial No. 165,687.

*To all whom it may concern:*

Be it known that I, LEENDERT JANSE, subject of the Queen of the Netherlands, and resident of Apeldoorn, in the Netherlands, have invented certain new and useful Improvements in Side Bearings for Railway-Vehicles and the like, of which the following is a specification.

The present invention relates to railway vehicles in which the vehicle-body is supported on bogies.

It is usual to support the weight of the body on center bearings or swivel plates, and to provide side bearings for preventing tipping of the body. It has been found that the known side bearings, even when of the roller or ball type, become useless after a time with the result that the bogies cannot swivel freely, the friction in rounding curves is greatly increased and the flanges of the wheel tire become cut. Consequently tires constantly have to be turned down, not simply because the treads are worn, but chiefly, because the flanges become dangerously thin and steep in their angle, which is liable to cause derailment.

Now the primary object of my present invention is to give ample play to the bogie in rounding curves, thereby enabling the curve to be made with the least friction, thus preventing derailment and obviating heavy wear and tear of the tires.

Another object of my invention is to minimize the tipping of the body and the bumping on the frame and the rails.

A further object of my invention is to obviate the necessity of lubricating the side bearings and to cause the same to respond instantly and at all times when the bogie starts to round a curve.

A still further object of my invention is to provide for side bearings insuring positive connection between the car body and the bogie so as to prevent the latter in case of derailment from assuming a transverse position with respect to the car body, and to obviate the necessity of using chains for this purpose.

Another object of my invention is to provide a side bearing of this character which will be simple, strong and durable, materially cheaper than the usual side bearings, efficient in operation, and well adapted for the purpose for which it is designed.

With these and other objects in view the invention consists of certain novel features of construction, combinations and arrangements of parts as will be hereinafter described and claimed.

In the accompanying drawing Figure 1 shows a sectional view of so much of a car body, its transom or bolster, the truck bolster and parts associated therewith, as to show one embodiment of the invention. Fig. 2. shows a sectional view on line A—A in Fig. 1. Fig. 3 is a front elevation of part of the body bolster, showing its articulating connection with the depending member forming part of the side bearing. Figs. 4, 5 and 6 are a side view, a front elevation and a horizontal section respectively of the said depending member, showing how the said member engages the truck bolster. Fig. 7 shows a ball joint as may be used for the connection between the transom and the depending member. Fig. 8 illustrates a depending member engaging the truck bolster through a coiled spring. Fig. 9 shows another construction of the side bearings, with rollers for reducing friction.

Inasmuch as side bearings are generally immediately associated with the transoms and the truck bolsters, the following description will be had with reference to such an arrangement, though I do not wish to be limited thereto.

Referring now to Figs. 2 and 3 of the drawing, the transom or body bolster consists of a tie plate 1 and two angle irons 2. A depending member 3 is pivotally connected with said transom 1, 2 by means of a bolt 4 passing through an eye of said member 3 and through bearing recesses in two brackets or downwardly projecting bearing blocks 5 bolted to the underside of the angle irons 2. The lower end of the depending member 3 passes through elongated openings or slots 6 and 7 in the top and bottom plates 8 and 9 respectively of the box-pattern bogie bolster, which is vertically slidable in and through coiled springs 10 yieldingly supported by a frame 11 secured to the journal boxes 12 and 13 for the wheel axles.

The lower end of the depending member 3 is formed by a lateral projection 14 extending in a direction parallel with the bolt or pivot 4 and whose length is greater than the width of the slot 7 extending in a direction at right angles with the said pivot 4, cf. Figs. 4, 5 and 6. The top 15 of the lateral projection 14 is rounded so as to reduce friction, the clearance between this top and the bottom side of the plate 9 of the bogie bolster being about 2 to 3 millimeters for meter gage, when the car body assumes its normal position. The slots 6 and 7 are given a length that will suit the maximum swing of the depending member 3 that is likely to occur.

It will now be clear what the fundamental difference is between my improved side bearing and the known constructions. With the latter the side bearing at that side of the car body which moves downward is under strain of pressure, whereas my improved side bearing is under strain of tension at the rising side of the car.

The advantageous features of my improved side bearing as stated in the preamble of this specification will now be fully appreciated. Owing to the articulating connection between the depending member 3 and the transom 1, 2, the movements of the bogie are not interfered with if the depending member 3 is under strain of tension. Besides, the lower end of the depending member 3 is free to move in the slots 6 and 7, so that said member may always assume a vertical position even in case the bogie has turned a certain angular distance with respect to the car body. This freedom of movement accounts for the reduced friction between the wheel tire flanges and the rails, and consequently for the reduced wear and tear.

As already stated above, the clearance between the bearing surface of the side bearing and the bearing surface of the bogie bolster needs only be about 2-3 millimeters for meter gage; with the usual constructions this clearance is about 10 millimeters, which necessarily causes considerable bumping and tipping of the car body.

Fig. 7 illustrates a ball or knuckle joint between the depending member 3 and the transom 1, 2. In this figure, 16 is a knuckle formed at the end of the member 3, the said knuckle being engaged between two semispherical depressions in the downwardly-depending bearing 18 bolted to the angle irons 2 of the body-bolster. It has however been found in practice that a simple pivot 4 as shown in Figs. 1 and 2 is quite sufficient and well adapted for the purpose stated.

The lower end of the depending member 3 may engage the bogie bolster through a coiled spring or through a resilient rubber cushion. A construction with a coiled spring is shown in Fig. 8, wherein 3 is the depending member passing through a slot 7 in the plate 9 of the bogie bolster. The lower end of said member is provided with a pressure disk or washer 19 secured thereon by means of a nut 20 and a split pin 21, a coiled spring 22 being provided between said disk or washer and the plate 9.

Fig. 9 illustrates a depending member provided at its lower end with rollers for minimizing the friction between said member and the bogie bolster when the bogie rounds a curve. In this figure, 3 is the depending member, 4 its pivot and 9 the bottom plate of the box-pattern bogie bolster. The lateral projection 14 of the member 3 is provided at both ends with journals 23, 24 integral therewith, rollers 25 and 26 being rotatably mounted on said journals and secured thereon by any suitable means such as nuts 27, 28 and split pins 29, 30. If so desired the rollers 25 and 26 might be mounted on ball or roller bearings.

Having now particularly described and ascertained the nature of my present invention and in what manner the same is to be performed, I declare that what I claim is:

1. In a vehicle of the type referred to, a car body pivotally supported by a bogie, and depending members articulated to said body at two or more points on opposite sides of the center bearing, the said members passing through openings in the bogie bolster extending in a direction at substantially right angles to the wheel axles of the vehicle, so as to be free to follow the downward movements of that side of the body to which it is articulated, but adapted to engage the bogie on the reverse movement of the body.

2. In a vehicle of the type referred to, a car body pivotally supported by a bogie, and depending members articulated to said body at two or more points on opposite sides of the center bearing, the lower end of the said depending members passing through slots extending in the bogie bolster in a direction at substantially right angles to the wheel axles, and being provided with lateral projections extending substantially parallel with the said wheel axles.

3. In a vehicle of the type referred to, a car body pivotally supported by a bogie, depending members articulated to said body at two or more points on opposite sides of the center bearing, the lower end of the said depending members passing through slots extending in the bogie bolster in a direction at substantially right angles to the wheel axles, and resilient means provided between the lower end of the said members and the bearing plate of the bogie bolster.

4. In a vehicle of the type referred to, a car body pivotally supported by a bogie, depending members articulated to said body at two or more points on opposite sides of the center bearing, the lower end of the said depending members passing through slots extending in the bogie bolster in a direction at substantially right angles to the wheel axles, and rolling means at the lower end of said depending members and adapted to engage the bearing plate of the bogie bolster.

Signed at Scheveningen, the Netherlands, this 24th day of March, A. D. 1917.

LEENDERT JANSE.

Copies of this patent may be obtained for five cents each, by addressing the "Commissioner of Patents, Washington, D. C."